US011310839B2

(12) United States Patent
Ye et al.

(10) Patent No.: US 11,310,839 B2
(45) Date of Patent: Apr. 19, 2022

(54) GRANT-FREE TRANSMISSION METHOD, USER EQUIPMENT AND BASE STATION

(71) Applicant: NTT DOCOMO, INC., Tokyo (JP)

(72) Inventors: Neng Ye, Beijing (CN); Xiangming Li, Beijing (CN); Xiaohang Chen, Beijing (CN); Xiaolin Hou, Beijing (CN); Qun Zhao, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 270 days.

(21) Appl. No.: 16/495,661

(22) PCT Filed: Feb. 28, 2018

(86) PCT No.: PCT/CN2018/077466
§ 371 (c)(1),
(2) Date: Sep. 19, 2019

(87) PCT Pub. No.: WO2018/171394
PCT Pub. Date: Sep. 27, 2018

(65) Prior Publication Data
US 2020/0100282 A1 Mar. 26, 2020

(30) Foreign Application Priority Data
Mar. 20, 2017 (CN) .......................... 201710164849.6

(51) Int. Cl.
*H04W 74/08* (2009.01)
*H04W 72/04* (2009.01)
(Continued)

(52) U.S. Cl.
CPC ..... *H04W 74/085* (2013.01); *H04W 72/0446* (2013.01); *H04W 72/082* (2013.01); *H04W 74/004* (2013.01)

(58) Field of Classification Search
CPC ......... H04W 74/0085; H04W 72/0446; H04W 72/082; H04W 74/004
See application file for complete search history.

(56) References Cited

U.S. PATENT DOCUMENTS 10,382,169 B2 * 8/2019 Cao .................... H04L 1/0079
2014/0192767 A1 * 7/2014 Au ..................... H04W 74/0866
370/330

(Continued)

FOREIGN PATENT DOCUMENTS

CN 101340714 A 1/2009
CN 101754242 A 6/2010
(Continued)

OTHER PUBLICATIONS

Huawei, et al., Solutions for Collisions of MA Signatures, 3GPP TSG RAN WG1 Meeting #86bis, R1-1608860, Oct. 14, 2016 (Oct. 14, 2016), sections 1-3.
(Continued)

*Primary Examiner* — Christopher M Crutchfield
*Assistant Examiner* — Tito Q Pham
(74) *Attorney, Agent, or Firm* — Harness, Dickey & Pierce, P.L.C.

(57) ABSTRACT

The present disclosure provides a grant-free transmission method, a user equipment, and a base station. The grant-free transmission method at a user equipment side includes: step a, sending a first multiple access signature selected by a user equipment to a base station; step b, receiving an intervention result of the base station for the user equipment; step c, determining, when the intervention result is to adopt the first multiple access signature, to adopt the first multiple access signature for data transmission; and step d, determining, when the intervention result is to adopt a second multiple access signature, to adopt the second multiple access signature for the data transmission. According to the grant-free
(Continued)

transmission method, the user equipment, and the base station provided by the present disclosure, the collision during the grant-free transmission is avoided or reduced with less signaling overhead.

18 Claims, 4 Drawing Sheets

(51) Int. Cl.
*H04W 72/08* (2009.01)
*H04W 74/00* (2009.01)

(56) References Cited

U.S. PATENT DOCUMENTS

| | | | |
|---|---|---|---|
| 2016/0150564 A1* | 5/2016 | Quan | H04W 28/0278 370/329 |
| 2016/0352454 A1 | 12/2016 | Zhang et al. | |
| 2017/0034845 A1 | 2/2017 | Liu et al. | |
| 2018/0063869 A1* | 3/2018 | Zhang | H04W 74/0833 |
| 2020/0146108 A1* | 5/2020 | Goto | H04W 88/06 |
| 2020/0154481 A1* | 5/2020 | Goto | H04W 74/004 |

FOREIGN PATENT DOCUMENTS

| | | |
|---|---|---|
| CN | 106160980 A | 11/2016 |
| CN | 106507497 A | 3/2017 |
| KR | WO 2017/209570 A1 * | 7/2017 |
| WO | WO2016171767 A1 | 10/2016 |

OTHER PUBLICATIONS

International Search Report (in English and Chinese) issued in International Application No. PCT/CN2018/077466, dated May 23, 2018; ISA/CN.
R1-1610077: SLS evaluation on uplink mutiple access, NTT DOCOMO, INC. 3GPP TSG RAN WG1 Meeting #86bis, Lisbon, Portugal Oct. 10-14, 2016.
"Discussion on grant fee transmittsion", Huawei, HiSilicon 3GPP TSG RAN WG1 Meeting #86 Gothenburg, Sweden, Aug. 22-26, 2016.
Chinese Office Action regarding application No. CN106160980 dated Sep. 2, 2021. Machine translation attached.

* cited by examiner

| Physical Resource unit \ multiple access signature Index | 1 | 2 | 3 | 4 | 5 | 6 |
|---|---|---|---|---|---|---|
| PRU1 | ■ | | | ■ | | |
| PRU2 | | ■ | | | ■ | |
| PRU3 | | | ■ | | | ■ |
| PRU4 | ■ | | | | | ■ |
| PRU5 | | ■ | | ■ | | |
| PRU6 | | | ■ | | ■ | |
| PRU7 | ■ | | | | | ■ |
| PRU8 | | ■ | | | ■ | |
| PRU9 | | | ■ | ■ | | |

GRANT-FREE TRANSMISSION METHOD, USER EQUIPMENT AND BASE STATION

CROSS REFERENCE TO RELATED APPLICATIONS

This application is a 371 National Stage of International Application No. PCT/CN2018/077466, filed on Feb. 28, 2018, which claims priority to Chinese Patent Application No. 201710164849.6, filed on Mar. 20, 2017. The entire disclosures of the above applications are incorporated herein by reference.

FIELD OF THE INVENTION

The present disclosure relates to the field of radio communications, and in particular, to a Grant-free (GF) transmission method, a user equipment, and a base station.

BACKGROUND OF THE INVENTION

In a radio communication system, data transmission modes between a user equipment and a base station include Grant-based Transmission and Grant-Free Transmission.

In the grant-based transmission, the user equipment obtains a dynamic uplink grant (UL Grant) from the base station before each uplink data transmission, which results in large signaling overhead, power consumption, and latency.

In the grant-free transmission, the user equipment selects a multiple access signature by itself, and adopts the multiple access signature for uplink data transmission, without obtaining a dynamic uplink grant from the base station, thereby reducing latency and signaling overhead on a control plane and a user plane. Due to the advantages of low latency and reduced signaling overhead when transmitting small data packets, the grant-free transmission is potentially to be used in specific scenarios of the 5th generation mobile communication system (5G) in the future.

However, in the grant-free transmission, if the user equipment selects the multiple access signature completely randomly, a collision may occur. In other words, interference between different user equipments when transmitting uplink data using multiple access signatures respectively selected by the user equipments is increased, a probability of successful data transmission is reduced, thereby reducing the performance of data transmission. Especially in the case of a large user load, a collision is more likely to occur.

Existing grant-free transmission modes include RACH (Random Access Channel)-less GF Transmission and RACH-based GF Transmission.

The RACH-less GF transmission has low latency, but is unable to synchronize the user equipment and the base station. When a collision occurs in transmission of preambles, the base station may be unable to successfully detect the data.

The RACH-based GF transmission needs to complete a random access procedure before transmitting data, which exchanges for synchronous grant-free transmission with greater signaling overhead, reduces receiving complexity of the base station, and saves unnecessary data transmission.

However, an existing four-step random access procedure, such as the Long Term Evolution (LTE)/Advanced Long Term Evolution (LTE-A, LTE-Advanced) random access procedure, or the Narrow Band Internet of Things (NB-IoT) random access procedure, is proposed for grant-based transmission, and is not suitable for grant-free transmission. One of the reasons is that the existing four-step random access procedure cannot transmit information about the grant-free transmission, especially about the multiple access signature, and thus cannot solve the collision problem. Another reason is that the existing four-step random access procedure has relatively large latency and signaling overhead.

The Simplified RACH (sRACH) proposed in discussion of the 3rd Generation Partnership Project (3GPP) solves the problem of relatively large latency and signaling overhead through a simplified two-step random access procedure. However, sRACH is also proposed for the grant-based transmission. In the two-step random access procedure, the information about the grant-free transmission, especially about the multiple access signature, cannot be transmitted. As such, the collision problem cannot be solved either.

It can be seen that in the existing art, the above collision problem exists in not only the RACH-less GF transmission but also the RACH-based GF transmission. In order to avoid collision, the base station may pre-allocate the multiple access signature of each user equipment. However, in order to support a sufficient number of multiple access signatures, the base station needs to use a large amount of signaling to pre-allocate the multiple access signatures of the user equipments, which results in unacceptable performance degradation. Therefore, how to avoid or reduce the collision in the grant-free transmission process with small signaling overhead has become a technical problem yet to be solved in the art.

SUMMARY OF THE INVENTION

The present disclosure is intended to provide grant-free transmission methods, a user equipment, and a base station, so that the collision during the grant-free transmission is avoided or reduced with less signaling overhead.

A grant-free transmission method at the user equipment according to the present disclosure includes:

step a, sending a first multiple access signature selected by a user equipment to a base station;

step b, receiving an intervention result of the base station for the user equipment;

step c, determining, when the intervention result is to adopt the first multiple access signature, to adopt the first multiple access signature for data transmission; and step d, determining, when the intervention result is to adopt a second multiple access signature, to adopt the second multiple access signature for the data transmission.

A grant-free transmission method at the mobile station according to the present disclosure includes:

step A, receiving, from respective user equipments, first multiple access signatures selected by the respective user equipments;

step B, predicting mutual interference caused by data transmission performed simultaneously by the respective user equipments using the first multiple access signatures of the respective user equipments, determining a respective user equipment of which mutual interference is predicted to be higher than a predetermined level as a user equipment to be intervened, and determining, for a respective user equipment of which mutual interference is predicted to be not higher than the predetermined level, that to adopt a first multiple access signature of the respective user equipment of which the mutual interference is predicted to be not higher than the predetermined level is an intervention result for the respective user equipment of which the mutual interference is predicted to be not higher than the predetermined level;

step C, for a respective user equipment to be intervened, selecting a multiple access signature capable of making the mutual interference not higher than the predetermined level as a second multiple access signature of the respective user equipment to be intervened, and determining that to adopt the second multiple access signature is an intervention result for the respective use equipment to be intervened; and step D, sending intervention results for the respective user equipments.

A user equipment according to the present disclosure includes:

a multiple access signature sending unit to send a first multiple access signature selected by a user equipment to a base station;

an intervention result receiving unit to receive an intervention result of the base station for the user equipment;

a multiple access signature determining unit to determine, when the intervention result is to adopt the first multiple access signature, to adopt the first multiple access signature for data transmission, and determine, when the intervention result is to adopt a second multiple access signature, to adopt the second multiple access signature for the data transmission.

A base station according to the present disclosure includes:

a multiple access signature receiving unit to receive, from respective user equipments, first multiple access signatures selected by the respective user equipments;

an intervention result determining unit to predict mutual interference caused by data transmission performed simultaneously by the respective user equipments using the first multiple access signatures of the respective user equipments, determine a respective user equipment of which mutual interference is predicted to be higher than a predetermined level as a user equipment to be intervened, determine, for a respective user equipment of which mutual interference is predicted to be not higher than the predetermined level, that to adopt a first multiple access signature of the respective user equipment of which the mutual interference is predicted to be not higher than the predetermined level is an intervention result for the respective user equipment of which the mutual interference is predicted to be not higher than the predetermined level, select, for a respective user equipment to be intervened, a multiple access signature capable of making the mutual interference not higher than the predetermined level as a second multiple access signature, and determine that to adopt the second multiple access signature is an intervention result for the respective user equipment; and an intervention result sending unit, to send intervention results for the respective user equipments.

Embodiments of the present disclosure provide a program, causing a computer to perform operations including:

step a, sending a first multiple access signature selected by a user equipment to a base station;

step b, receiving an intervention result of the base station for the user equipment;

step c, determining, when the intervention result is to adopt the first multiple access signature, to adopt the first multiple access signature for data transmission; and step d, determining, when the intervention result is to adopt a second multiple access signature, to adopt the second multiple access signature for the data transmission.

Embodiments of the present disclosure provide a non-transitory machine-readable storage medium, in which the storage medium stores machine-readable instructions, the machine-readable instructions being executed by a processor to perform operations including:

step a, sending a first multiple access signature selected by a user equipment to a base station;

step b, receiving an intervention result of the base station for the user equipment;

step c, determining, when the intervention result is to adopt the first multiple access signature, to adopt the first multiple access signature for data transmission; and step d, determining, when the intervention result is to adopt a second multiple access signature, to adopt the second multiple access signature for the data transmission.

Embodiments of the present disclosure provide a user equipment, including:

a processor;

a non-transitory machine-readable storage medium; and a program module stored in the non-transitory machine-readable storage medium and executed by the processor;

in which the program module is to:

step a, send a first multiple access signature selected by a user equipment to a base station;

step b, receive an intervention result of the base station for the user equipment;

step c, determine, when the intervention result is to adopt the first multiple access signature, to adopt the first multiple access signature for data transmission; and step d, determine, when the intervention result is to adopt a second multiple access signature, to adopt the second multiple access signature for the data transmission.

Embodiments of the present disclosure provide a program, causing a computer to perform operations including:

step A, receiving, from respective user equipments, first multiple access signatures selected by the respective user equipments;

step B, predicting mutual interference caused by data transmission performed simultaneously by the respective user equipments using the first multiple access signatures of the respective user equipments, determining a respective user equipment of which mutual interference is predicted to be higher than a predetermined level as a user equipment to be intervened, and determining, for a respective user equipment of which mutual interference is predicted to be not higher than the predetermined level, that to adopt a first multiple access signature of the respective user equipment of which the mutual interference is predicted to be not higher than the predetermined level is an intervention result for the respective user equipment of which the mutual interference is predicted to be not higher than the predetermined level;

step C, for a respective user equipment to be intervened, selecting a multiple access signature capable of making the mutual interference not higher than the predetermined level as a second multiple access signature, and determining that to adopt the second multiple access signature is an intervention result for the respective use equipment to be intervened; and step D, sending intervention results for the respective user equipments.

Embodiments of the present disclosure provide a non-transitory machine-readable storage medium, in which the storage medium stores machine-readable instructions, the machine-readable instructions being executed by a processor to perform operations including:

step A, receiving, from respective user equipments, first multiple access signatures selected by the respective user equipments;

step B, predicting mutual interference caused by data transmission performed simultaneously by the respective user equipments using the first multiple access signatures of the respective user equipments, determining a respective user equipment of which mutual interference is predicted to be higher than a predetermined level as a user equipment to be intervened, and determining, for a respective user equipment of which mutual interference is predicted to be not higher than the predetermined level, that to adopt a first multiple access signature of the respective user equipment of which the mutual interference is predicted to be not higher than the predetermined level is an intervention result for the respective user equipment of which the mutual interference is predicted to be not higher than the predetermined level;

step C, for a respective user equipment to be intervened, selecting a multiple access signature capable of making the mutual interference not higher than the predetermined level as a second multiple access signature, and determining that to adopt the second multiple access signature is an intervention result for the respective use equipment to be intervened; and step D, sending intervention results for the respective user equipments.

Embodiments of the present disclosure provide a base station, including:

a processor;

a non-transitory machine-readable storage medium; and a program module stored in the non-transitory machine-readable storage medium and executed by the processor;

in which the program module is to:

step A, receive, from respective user equipments, first multiple access signatures selected by the respective user equipments;

step B, predict mutual interference caused by data transmission performed simultaneously by the respective user equipments using the first multiple access signatures of the respective user equipments, determine a respective user equipment of which mutual interference is predicted to be higher than a predetermined level as a user equipment to be intervened, and determine, for a respective user equipment of which mutual interference is predicted to be not higher than the predetermined level, that to adopt a first multiple access signature of the respective user equipment of which the mutual interference is predicted to be not higher than the predetermined level is an intervention result for the respective user equipment of which the mutual interference is predicted to be not higher than the predetermined level;

step C, for a respective user equipment to be intervened, select a multiple access signature capable of making the mutual interference not higher than the predetermined level as a second multiple access signature, and determine that to adopt the second multiple access signature is an intervention result for the respective user equipment to be intervened; and step D, send intervention results for the respective user equipments.

According to the grant-free transmission methods, the user equipment, and the base station of the present disclosure, through the two-step signaling interaction between the user equipment and the base station, self-selection of the user equipment is combined with intervention of the base station to determine the multiple access signature used for data transmission, so that the collision during the grant-free transmission is avoided with less signaling overhead.

In addition, the user equipment and the base station in the present disclosure may implement the two-step signaling interaction using an existing random access procedure, so that an existing equipment may be utilized to the greatest extent, thereby reducing the cost.

DETAILED DESCRIPTION OF THE INVENTION

To make the objective, technical solution, and advantages of the present disclosure more clearly, embodiments of the present disclosure will be described in detail in the following with reference to the accompanying drawings.

Figure 1:
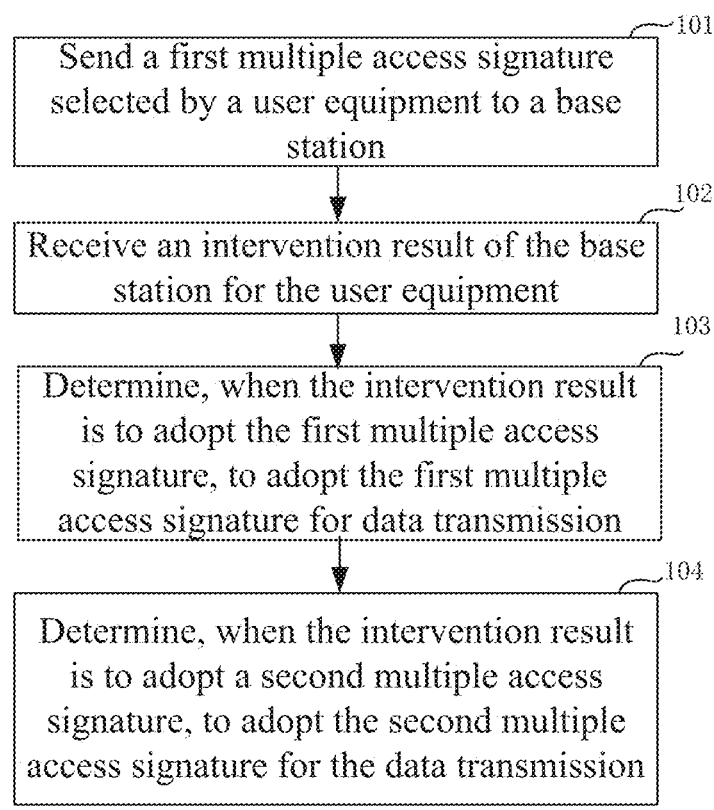
FIG. 1 is a schematic flowchart illustrating a grant-free transmission method at a user equipment side according to an embodiment of the present disclosure.

FIG. 1 is a schematic flowchart illustrating a grant-free transmission method at a user equipment side according to an embodiment of the present disclosure. The method includes the following operations.

At step 101, a first multiple access signature selected by a user equipment is sent to a base station.

In the grant-free transmission, in addition to physical resources actually required in the transmission, a specific transmission mode is mainly characterized by a multiple access signature. Specifically, the multiple access signature may include a combination of any one or more of an available physical resource (such as a time-frequency resource), a time-frequency hopping pattern, a random seed, a codeword, codebook interleaving, a channel coding rate, a spread spectrum code, transmission power, Reference Signal Receiving Power (RSRP), a physical region for multi-beam operation, a precoding matrix in a multi-antenna system, and the like. Information about the multiple access signature, such as the number, index, and specific meaning, may be configured in a static or semi-static manner, to enable sharing of the information between the base station and each user equipment.

For example, at this step, the user equipment may select a multiple access signature, i.e., a first multiple access signature, it intends to use in data transmission, from a predefined multiple access signature pool (MA signature pool). The specific selection method may be random selection, but is not limited thereto.

At this step, the user equipment may send the selected first multiple access signature to the base station using a random access request, but is not limited thereto.

The user equipment may explicitly include an index of the first multiple access signature in the random access request, for example, using a data payload of Msg.1 of the sRACH. The advantage of explicit sending is that the implementation is simple.

Alternatively, correspondence between indexes of multiple access signatures and random access requests may be predefined. The user equipment implicitly sends the first multiple access signature through the random access request according to the correspondence. The above correspondence may be configured in a static or semi-static manner, to enable sharing of the correspondence between the base station and each user equipment. The advantage of implicit sending is that a format of existing signaling, such as Msg.1 of RACH, may be used.

For example, the user equipment may select, according to predefined correspondence between indexes of multiple access signatures and combinations of physical resources used by random access requests, and preamble indexes and/or IDs of user equipments, a first combination from more than one combination corresponding to the index of the first multiple access signature. The user equipment may include, in the random access request, a preamble corresponding to a preamble index in the first combination and/or an ID of the user equipment in the first combination, and send the random access request to the base station using a physical resource in the first combination.

Alternatively, when an index of a multiple access signature includes a first part and a second part, the first multiple access signature may be sent in a mode that mixes the explicit mode and the implicit mode. The advantage of the mixed mode is that it is convenient to support a larger number of multiple access signatures.

For example, the user equipment may select, according to predefined correspondence between first parts of indexes of multiple access signatures and combinations of physical resources used by random access requests (e.g., Msg.1 of sRACH), preamble indexes and/or IDs of user equipments, a first combination from more than one combination corresponding to a first part of the index of the first multiple access signature. The user equipment may include, in the random access request, a preamble corresponding to a preamble index in the first combination and/or an ID of the user equipment in the first combination, and a second part of the index of the first multiple access signature. The user equipment may send the random access request to the base station using a physical resource in the first combination.

When the number of multiple access signatures in the system is large, all of the multiple access signatures may be divided into multiple groups. In this case, an index of a multiple access signature may include a group index and an index within the group which may respectively correspond to the first part and the second part described above, or vice versa. The manner of grouping the multiple access signatures is not particularly limited. It is preferable to perform the grouping according to mutual interference caused when data transmission is performed using different multiple access signatures. For example, multiple access signatures in which mutual interference is relatively small belong to a same group, while multiple access signatures in which mutual interference is relatively large belong to different groups.

A specific example of the mixed mode is described below. It is assumed that multiple access signatures in a system are divided into four groups, and correspondence between group indexes and combinations of physical resources used by Msg.1 of the sRACH and preamble indexes are predefined, as shown in Table 1. When the index of the first multiple access signature selected by the user equipment is the group index '2'+ the index within the group '3', according to the correspondence shown in Table 1, the first combination corresponding to the group index '2' is determined to be the physical resources 'R2' and the preamble index '1'. Then the user equipment may include, in Msg.1, a preamble corresponding to the preamble index '1' in the first combination and explicitly the index within the group '3'. The user equipment may send Msg.1 to the base station using the physical resources 'R2' in the first combination.

TABLE 1

| group index | physical resources | preamble index |
|---|---|---|
| 1 | R1 | 1 |
| 2 | R2 | 1 |
| 3 | R1 | 2 |
| 4 | R2 | 2 |

At step 102, an intervention result of the base station for the user equipment is received.

When the intervention result of the base station for the user equipment is not received within a preset period of time, it is preferred to wait for a specified period of time and then return to step 101 to re-send the first multiple access signature to the base station. The above specified period of time may be zero. Of course, the user equipment may not return to perform step 101, but adopts another random access method for random access and then performs the grant-free transmission, or directly performs the RACH-less GF transmission.

At this step, the user equipment may receive the intervention result of the base station for the user equipment through a random access response (for example, Msg. 2 of RACH or sRACH), but is not limited thereto.

At step 103, when the intervention result is to adopt the first multiple access signature, it is determined to adopt the first multiple access signature for data transmission.

In this case, it may be considered that the mutual interference caused by the data transmission using the first multiple access signature selected by the user equipment is within a range allowed by the system. In other words, a collision will not occur or a degree of the collision is within a range allowed by the system. As such, it is determined to adopt the first multiple access signature for data transmission.

At step 104, when the intervention result is to adopt a second multiple access signature, it is determined to adopt the second multiple access signature for data transmission.

In this case, it may be considered that the mutual interference caused by the data transmission using the first multiple access signature selected by the user equipment is beyond the range allowed by the system. In other words, the degree of the collision may be beyond the range allowed by the system. As such, it is determined to adopt the second multiple access signature allocated by the base station for data transmission to avoid or reduce the collision during the grant-free transmission.

At this step, corresponding to step 102, the user equipment may acquire the second multiple access signature through a random access response (for example, Msg. 2 of RACH or sRACH), but is not limited thereto.

The user equipment may explicitly acquire the second multiple access signature according to an index of the second multiple access signature included in the received random access response. Alternatively, the user equipment may calculate an index of the second multiple access signature according to the index of the first multiple access signature and an offset between the index of the second multiple access signature and the index of the first multiple access signature included in the received random access response, and explicitly acquire the second multiple access signature according to the index of the second multiple access signature. In this case, when multiple access signatures in the system are divided into multiple groups, the above offset may include two parts, i.e., a group offset and an offset within the group. The explicit acquiring requires adding a corresponding field in an existing random access response.

Alternatively, correspondence between indexes of multiple access signatures and random access responses may be predefined. The user equipment may implicitly acquire, according to the correspondence, the second multiple access signature through the random access response. The above correspondence may be configured in a static or semi-static manner to enable sharing of the correspondence between the base station and each user equipment. The advantage of the implicit acquiring is that an existing signaling format may be used.

For example, the user equipment may determine an index of a multiple access signature corresponding to a physical resource used by the received random access response as the index of the second multiple access signature, according to predefined correspondence between indexes of multiple access signatures and physical resources used by random access responses. The user equipment may acquire the second multiple access signature according to the index of the second multiple access signature.

Alternatively, when an index of a multiple access signature includes a first part and a second part, the second multiple access signature may be acquired in a mode that mixes the explicit mode and the implicit mode. The advantage of the mixed mode is that it is convenient to support a larger number of multiple access signatures.

For example, the user equipment may determine a first part of an index of a multiple access signature corresponding to a physical resource used by the received random access response as a first part of the index of the second multiple access signature according to predefined correspondence between first parts of indexes of multiple access signatures and physical resources used by random access responses. The user equipment may combine the first part and a second part of the index of the second multiple access signature included in the received random access response to obtain the index of the second multiple access signature. The user equipment may acquire the second multiple access signature according to the index of the second multiple access signature.

For another example, the user equipment may determine a first part of an index of a multiple access signature corresponding to a physical resource used by the received random access response as a first part of the index of the second multiple access signature according to predefined correspondence between first parts of indexes of multiple access signatures and physical resources used by random access responses. The user equipment may calculate a second part of the index of the second multiple access signature according to the index of the first multiple access signature and an offset between the second part of the index of the second multiple access signature and a second part of the index of the first multiple access signature included in the received random access response. The user equipment may combine the first part and the second part to obtain the index of the second multiple access signature. The user equipment may acquire the second multiple access signature according to the index of the second multiple access signature.

When the base station adopts a partial intervention mode for the user equipment, i.e., when an index of a multiple access signature is divided into an intervention part and a non-intervention part, the user equipment may use the explicit mode, the implicit mode or the mixed mode to acquire an intervention part of the index of the second multiple access signature allocated by the base station, and may select, by itself, a non-intervention part of the index of the second multiple access signature, thereby acquiring the complete index of the second multiple access signature. Such partial intervention mode also reduces the collision during grant-free transmission to a certain extent and provides flexibility in implementation.

The grant-free transmission method at the user equipment side according to embodiments of the present disclosure is described above. The method combines, through two steps of signaling interactions between the user equipment and the base station, self-selection of the user equipment with intervention of the base station to determine the multiple access signature used for data transmission, so that the collision during the grant-free transmission is avoided or reduced with small signaling overhead.

Figure 2:
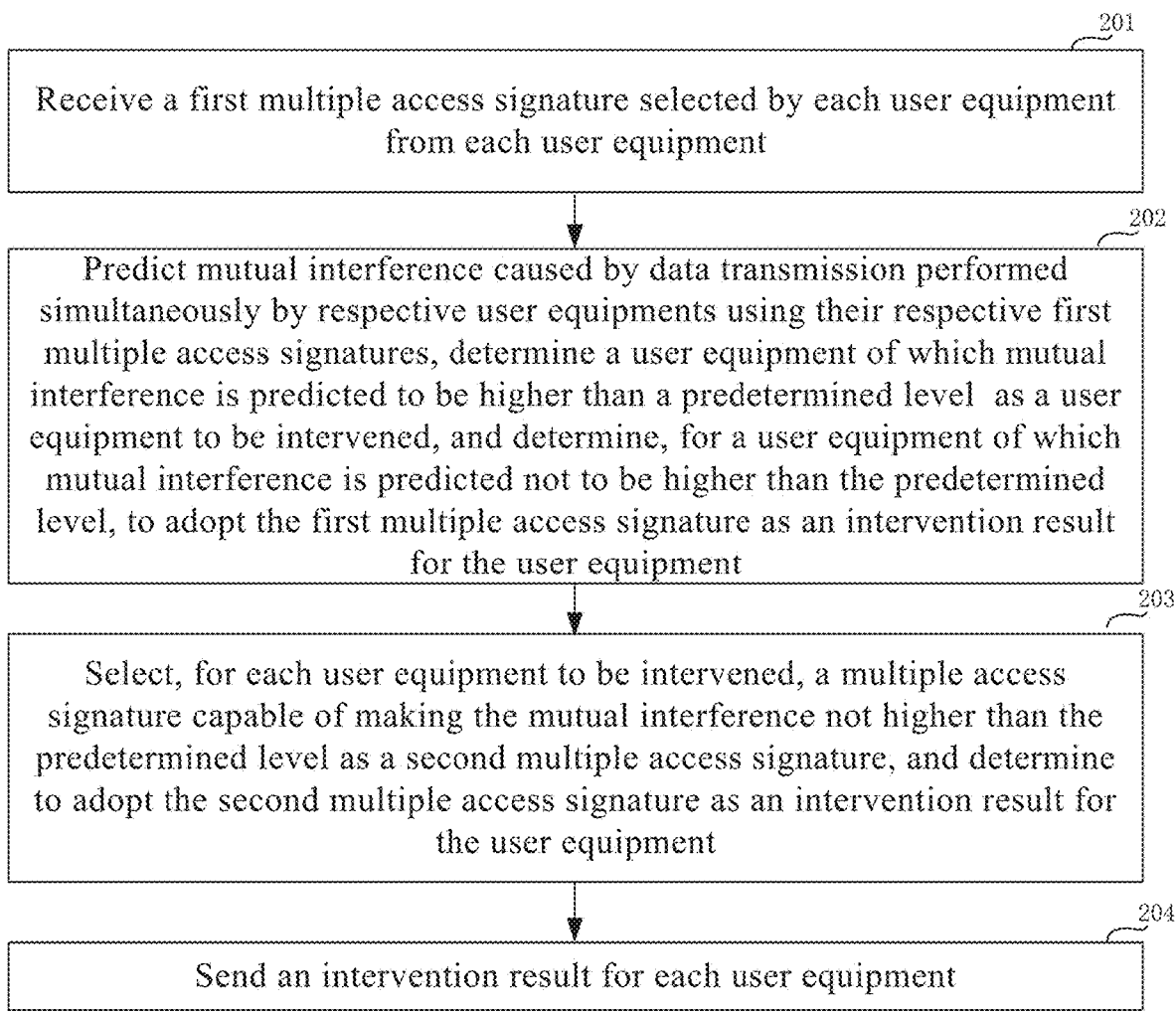
FIG. 2 is a schematic flowchart illustrating a grant-free transmission method at a base station side according to an embodiment of the present disclosure.

FIG. 2 is a schematic flowchart illustrating a grant-free transmission method at a base station side according to an embodiment of the present disclosure. The method includes the following operations.

At step 201, a first multiple access signature selected by each user equipment is received from each user equipment.

At this step, the base station may receive the first multiple access signature of each user equipment through a random access request sent by each user equipment, but is not limited thereto.

Corresponding to step 101, at this step, the base station may acquire the first multiple access signature of each user equipment through three modes including an explicit mode, an implicit mode, and a mixed mode.

For example, the base station may explicitly acquire a first multiple access signature of a user equipment according to an index of the first multiple access signature included in a random access request (for example, Msg.1 of the sRACH) sent from the user equipment.

Alternatively, the base station may determine, according to predefined correspondence between indexes of multiple access signatures and combinations of physical resources used by random access requests (for example, Msg.1 of RACH or sRACH), and preamble indexes and/or IDs of user equipments, an index of a multiple access signature corresponding to a combination of a physical resource used by the random access request sent by the user equipment, and a preamble index included in the random access request and/or an ID of the user equipment included in the random access request, as the index of the first multiple access signature of the user equipment. The base station may acquire the first multiple access signature of the user equipment according to the index of the first multiple access signature.

Alternatively, the base station may determine, according to predefined correspondence between first parts of indexes of multiple access signatures and combinations of physical resources used by random access requests (e.g., Msg.1 of sRACH), and preamble indexes and/or ID of user equipments, a first part of an index of a multiple access signature corresponding to a combination of a physical resource used by the random access request sent by the user equipment, and a preamble index included in the random access request and/or an ID of the user equipment included in the random access request, as a first part of the index of the first multiple access signature of the user equipment. The base station may combine the first part with a second part of the index of the first multiple access signature included in the random access request sent by the user equipment to obtain the index of the first multiple access signature of the user equipment. The base station may acquire the first multiple access signature of the user equipment according to the index of the first multiple access signature of the user equipment.

At this step, if a channel condition is poor, the base station may be not able to detect a first multiple access signature of a user equipment after receiving a random access request sent by the user equipment. In this case, in an example, the base station may ignore the random access request sent by the user equipment. In another example, if a preamble and/or an ID of the user equipment included in the random access request sent by the user equipment has been detected, the user equipment may be determined as a user equipment to be intervened, so as to allocate an appropriate multiple access signature for the user equipment in a subsequent step. Otherwise, the random access request sent by the user equipment may be ignored.

At step 202, mutual interference caused by data transmission performed simultaneously by respective user equipments using their respective first multiple access signatures is predicted. A user equipment of which mutual interference is predicted to be higher than a predetermined level is determined as a user equipment to be intervened. For a user equipment of which mutual interference is predicted not to be higher than the predetermined level, to adopt the first multiple access signature is determined as an intervention result for the user equipment.

At this step, a manner for representing the mutual interference caused by data transmission performed simultaneously by the respective user equipments using their respective first multiple access signatures is not particularly limited. For example, when the multiple access signature indicates available physical resources, the mutual interference described above may be represented by the number of overlapped resource units. The larger the number of the overlapped resource units is, the higher the level of the mutual interference is. For another example, when the multiple access signature indicates an available spread spectrum code, the mutual interference may be represented by a degree of orthogonality between spread spectrum codes. When two spread spectrum codes are orthogonal or quasi-orthogonal, it may be considered that the level of the mutual interference is relatively low. When the multiple access signature is represented in a sequence form, the above mutual interference may be represented by a correlation between sequences. Two identical sequences have the greatest correlation, i.e., the highest level of the mutual interference.

Figures 3, 4:
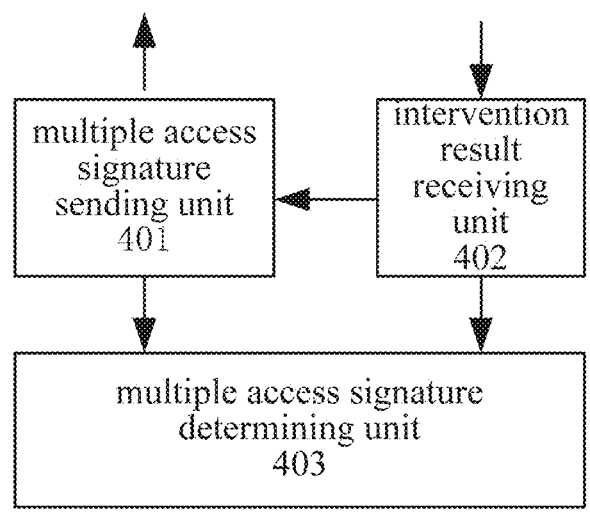
FIG. 3 is a schematic diagram illustrating mutual interference when user equipments simultaneously transmit data using respective multiple access signatures according to an embodiment of the present disclosure.
FIG. 4 is a schematic diagram illustrating the components of a user equipment according to an embodiment of the present disclosure.

FIG. 3 is a schematic diagram illustrating mutual interference when user equipments simultaneously transmit data using their respective multiple access signatures according to an embodiment of the present disclosure. In the example of FIG. 3, it is assumed that a multiple access signature indicates available physical resources, and a total of nine orthogonal physical resource units are used for grant-free transmission, but are not limited thereto, and may be other numbers. Each column in FIG. 3 represents a multiple access signature. In the example of FIG. 3, it is assumed that there are a total of six multiple access signatures which correspond to indexes 1 to 6, respectively, but are not limited thereto, and may be other numbers of multiple access signatures. Each column includes nine cells, corresponding to nine orthogonal physical resource units PRU1-PRU9, respectively. A cell filled with gray in each column represents an available physical resource unit corresponding to the multiple access signature. In the example of FIG. 3, each column includes three cells filled with gray, but are not limited thereto, and may be other numbers of cells.

In the example of FIG. 3, available physical resource units corresponding to the multiple access signature 1 are (PRU 1, PRU 4, PRU 7), available physical resource units corresponding to the multiple access signature 2 are (PRU 2, PRU 5, PRU 8), available physical resource units corresponding to the multiple access signature 3 are (PRU 3, PRU 6, PRU 9), available physical resource units corresponding to the multiple access signature 4 are (PRU 1, PRU 5, PRU 9), available physical resource units corresponding to the multiple access signature 5 are (PRU 2, PRU 6, PRU 8), and available physical resource units corresponding to the multiple access signature 6 are (PRU 3, PRU 4, PRU 7).

There is one overlapped physical resource unit (PRU 5) between the multiple access signatures 2 and 4. As such, it may be predicted that when respective user equipments use the multiple access signatures 2 and 4, respectively, to perform data transmission simultaneously, the generated mutual interference=1.

There are two overlapped physical resource units (PRU 2, PRU 8) between the multiple access signatures 2 and 5. As such, it may be predicted that when respective user equipments use the multiple access signatures 2 and 5, respectively, to perform data transmission simultaneously, the generated mutual interference=2.

The mutual interference allowed by the system may be indicated by a preset threshold $I_T$. When the mutual interference is greater than the preset threshold, it is predicted that the mutual interference is higher than a predetermined level. When the mutual interference is less than or equal to the preset threshold, it is predicted that the mutual interference is not higher than the predetermined level. The setting of the threshold is not particularly limited, and may be set according to a receiving method of the base station, e.g., a high-level receiver corresponds to a high threshold and a low-level receiver corresponds to a low threshold, or may be set according to a channel coding rate, e.g., a low code rate corresponds to a high threshold and a high code rate corresponds to a low threshold, or may also be set according to both of the receiving method and the channel coding rate, or other suitable criteria.

In the example of FIG. 3, if the threshold $I_T=0$ is set in advance, it means that no collision is allowed. If the threshold $I_T=1$ is set in advance, it means that a low degree of collision is allowed. The mutual interference may be mitigated by, for example, Forward Error Correction (FEC) and the like.

In the example of FIG. 3, it is assumed that the base station receives first multiple access signatures from three user equipments at step 201, in which an index of a first multiple access signature of user equipment 1 is 1, an index of a first multiple access signature of user equipment 2 is 2, and an index of a first multiple access signature of user equipment 3 is 4. At this step, the base station predicts that $I_{1-2}=0$, $I_{1-3}=I_{2-3}=1$, where $I_{i-j}$ represents the mutual interference generated when user equipment i and user equipment j perform data transmission using their respective multiple access signatures.

When $I_T=1$, since $I_{1-2}<I_T$ and $I_{1-3}=I_{2-3}=I_T$, for each user equipment of which the mutual interference is predicted to be less than or equal to the preset threshold, i.e., the user equipments 1, 2 and 3, the base station determines to adopt the first multiple access signature as an intervention result for the user equipment.

When $I_T=0$, since $I_{1-2}=I_T$ and $I_{1-3}=I_{2-3}>I_T$, for each user equipment of which the mutual interference is predicted to be less than or equal to the preset threshold, i.e., the user equipments 1 and 2, the base station determines to adopt the first multiple access signature as an intervention result for the user equipment. And, the base station determines the user equipment 3 of which the mutual interference is predicted to be larger than the preset threshold as a user equipment to be intervened, so as to allocate an appropriate multiple access signature for it at a subsequent step.

At step 203, for each user equipment to be intervened, a multiple access signature capable of making the mutual interference not higher than the predetermined level is selected as a second multiple access signature, and to adopt the second multiple access signature is determined as an intervention result for the user equipment.

For example, at step 202, the user equipment 3 is determined as the user equipment to be intervened when $I_T=0$. At this step, the base station may select a multiple access signature of which an index is 3 as a second multiple access signature of user equipment 3, so that when user equipment 3 adopts the second multiple access signature, $I_{1-3} = I_{2-3} = 0 = I_T$, and the base station determines to adopt the second multiple access signature as an intervention result for user equipment 3.

At this step, when the base station is unable to select, for a user equipment to be intervened, a multiple access signature capable of making the mutual interference not higher than the predetermined level, multiple strategies may be adopted.

For example, the base station may ignore the user equipment, i.e., not generating an intervention result for the user equipment. Alternatively, the base station may select a multiple access signature capable of minimizing the mutual interference as the second multiple access signature, and determine to adopt the second multiple access signature as the intervention result for the user equipment. Alternatively, the base station may randomly select a multiple access signature as the second multiple access signature, and determine to adopt the second multiple access signature as the intervention result for the user equipment.

For another example, the base station may adopt a partial intervention mode for the user equipment. In other words, an index of a multiple access signature is divided into an intervention part and a non-intervention part. The base station may determine an intervention part of an index of the second multiple access signature, leave a non-intervention part of the index of the second multiple access signature to the user equipment for selecting by the user equipment, and determine to adopt the second multiple access signature as the intervention result for the user equipment. Such a partial intervention mode also reduces the collision during grant-free transmission to a certain extent and provides flexibility in implementation. When determining the intervention part of the index of the second multiple access signature, the base station may select according to a preset configuration, or randomly select, or select according to the level of the mutual interference, i.e., selecting an intervention part of an index of a multiple access signature capable of making the level of the mutual interference relatively low.

As an example for the partial intervention mode, it is assumed that an intervention part of an index of a multiple access signature is a group index, and a non-intervention part of the index of the multiple access signature is an index within a group. The base station may reserve one or more groups of multiple access signatures for use when it is unable to select the multiple access signature capable of causing the mutual interference not higher than the predetermined level. The base station selects a group from the reserved groups, for example, selecting a group that may make the level of the mutual interference relatively low, and determines a group index of the group as the intervention part of the index of the second multiple access signature. The base station determines to adopt the second multiple access signature as the intervention result for the user equipment. The user equipment may select an index within the group by itself after receiving the group index, thereby obtaining the complete index of the second multiple access signature through combining the group index of the group and the index within the group.

As another example of the partial intervention, it is assumed that the intervention part of the index of the multiple access signature represents a channel coding rate and transmission power, and the non-intervention part of the index of the multiple access signature indicates available time-frequency resources or a precoding matrix in a multi-antenna system. The base station determines the intervention part of the index of the second multiple access signature, i.e., a channel coding rate and transmission power that the user equipment intends to use, while the available time-frequency resources or the precoding matrix in the multi-antenna system may be selected by the user equipment itself.

At step 204, an intervention result for each user equipment is sent.

In this step, the base station may send the intervention result for each user equipment through a random access response, but is not limited thereto.

For each user equipment of which the intervention result is to adopt the second multiple access signature, the base station may explicitly include the index of the second multiple access signature in the random access response, or calculate an offset between the index of the second multiple access signature and the index of the first multiple access signature and explicitly include the offset in the random access response. The explicit sending requires adding a corresponding field in an existing random access response.

Alternatively, correspondence between indexes of multiple access signatures and physical resources used by random access responses may be predefined. According to the correspondence, the base station implicitly sends, to each user equipment of which the intervention result is to adopt the second multiple access signature, a second multiple access signature of the user equipment through a random access response. The above correspondence may be configured in a static or semi-static manner to enable sharing of the correspondence between the base station and each user equipment. The advantage of the implicit sending is that an existing signaling format may be used.

For example, for each user equipment of which the intervention result is to adopt the second multiple access signature, the base station may send the random access response to the user equipment using physical resources corresponding to the index of the second multiple access signature.

Alternatively, when an index of a multiple access signature includes a first part and a second part, the base station may send, to the user equipment of which the intervention result is to adopt the second multiple access signature, the second multiple access signature of the user equipment through a mode that mixes the explicit mode and the implicit mode. The advantage of the mixed mode is that it is easier to support a larger number of multiple access signatures.

For example, for each user equipment of which the intervention result is to adopt the second multiple access signature, the base station may include a second part of the index of the second multiple access signature in the random access response, and send, according to predefined correspondence between first parts of indexes of multiple access signatures and physical resources used by random access responses, the random access response to the user equipment using physical resources corresponding to the first part of the index of the second multiple access signature.

For another example, for each user equipment of which the intervention result is to adopt the second multiple access signature, the base station may calculate an offset between the second part of the index of the second multiple access signature and the second part of the index of the first multiple access signature. The offset is included in the random access response. The base station may send, according to the predefined correspondence between the first parts of the indexes of the multiple access signatures and the physical resources used by the random access responses, the random access response to the user equipment using the physical resources corresponding to the first part of the index of the second multiple access signature.

For each user equipment adopting the partial intervention mode at step 203, the base station may send the intervention part of the index of the second multiple access signature of the user equipment in the explicit mode, the implicit mode or the mixed mode.

The grant-free transmission method at the base station side according to embodiments of the present disclosure is described above. The method combines, through the two steps of signaling interactions between the user equipment and the base station, self-selection of the user equipment with intervention of the base station to determine the multiple access signature used for data transmission, so that the collision during the grant-free transmission is avoided or reduced with less signaling overhead.

Hereinafter, still taking FIG. 3 as an example, embodiments in the case of a high bit rate and a low bit rate, respectively, are described in detail. In the following description, $I_{i-j}$ represents mutual interference generated when user equipment i and user equipment j perform data transmission using their respective multiple access signatures, and $I_T$ represents a threshold of the mutual interference.

Multiple access signatures 1 to 6 in FIG. 3 may be divided into one or more groups. As can be seen from FIG. 3, there is no overlapped physical resource unit among the multiple access signatures 1, 2 and 3. In other words, mutual interference will not be generated when respective user equipments simultaneously perform data transmission adopting the multiple access signatures 1, 2 and 3, respectively. Similarly, there is no overlapped physical resource unit among the multiple access signatures 4, 5 and 6. In other words, mutual interference will not be generated when respective user equipments simultaneously perform data transmission adopting the multiple access signatures 4, 5 and 6, respectively. As such, it is preferable to divide the multiple access signatures 1 to 6 into two groups in which a first group includes the multiple access signatures 1, 2 and 3, and a second group includes the multiple access signatures 4, 5 and 6. With such a grouping mode, mutual interference generated when adopting multiple access signatures in a same group may be less than or equal to mutual interference generated when adopting multiple access signatures in different groups. In the following description, such a preferred grouping mode is used as an example, but the present disclosure is not limited thereto. Even if other grouping modes are used, and even if there is only one group is divided, the present disclosure is equally applicable.

1. High Bit Rate Situation

As mentioned in the foregoing, in the case of a high bit rate, a relatively low threshold may be preset to indicate the mutual interference allowed by the system. In this case, $I_T$ is preset as 0, which means that no collision is allowed.

(1) Embodiment 1-1

TABLE 2

| user equipment | index of the first multiple access signature | index of the second multiple access signature | intervention result |
|---|---|---|---|
| 1 | 1 | — | to adopt the first multiple access signature |
| 2 | 2 | — | to adopt the first multiple access signature |
| 3 | 4 | 3 | to adopt the second multiple access signature |

As shown in Table 2, the user equipment 1 selects a first multiple access signature of which an index is 1 at step 101 and sends the first multiple access signature with the index being 1 to the base station, the user equipment 2 selects a first multiple access signature of which an index is 2 at step 101 and sends the first multiple access signature with the index being 2 to the base station, and the user equipment 3 selects a first multiple access signature of which an index is 4 at step 101 and sends the first multiple access signature with the index being 4 to the base station.

The base station receives the first multiple access signatures from the above three user equipments at step 201.

At step 202, the base station predicts, according to the number of overlapped physical resource units of available physical resources indicated by the respective multiple access signatures shown in FIG. 3, mutual interference generated when the above three user equipments perform data transmission adopting their respective first multiple access signatures, i.e., $I_{1-2}=0$ and $I_{1-3}=I_{2-3}=1$. Since $I_{1-2}=I_T$ and $I_{1-3}=I_{2-3}>I_T$, the base station determines, for each user equipment of which the mutual interference is predicted to be less than or equal to the preset threshold, i.e., the user equipments 1 and 2, as shown in Table 2, to adopt the first multiple access signature as the intervention result for the user equipment.

In addition, for the user equipment 3 of which the mutual interference is predicted to be greater than the preset threshold, as shown in Table 2, the base station selects a multiple access signature of which an index is 3 as a second multiple access signature for the user equipment 3 at step 203. As such, when the user equipment 3 adopts the second multiple access signature, $I_{1-3}=I_{2-3}=0=I_T$, and to adopt the second multiple access signature is determined as the intervention result for the user equipment 3.

The base station sends the intervention results for the user equipments 1, 2 and 3 at step 204.

The user equipment 1 receives the intervention result of the base station for it at step 102. The user equipment 1 determines, at step 103, to adopt the first multiple access signature, i.e., the multiple access signature with the index being 1, for data transmission.

The user equipment 2 receives the intervention result of the base station for it at step 102. The user equipment 2 determines, at step 103, to adopt the first multiple access signature, i.e., the multiple access signature with the index being 2, for data transmission.

The user equipment 3 receives the intervention result of the base station for it at step 102. The user equipment 3 determines, at step 104, to adopt the second multiple access signature, i.e., the multiple access signature with the index being 3, for data transmission.

In this embodiment, the user equipments 1, 2 and 3 are originally intended to adopt the multiple access signatures 1, 2 and 4, respectively, for grant-free transmission, in which a collision may occur. By performing the grant-free transmission method of the present disclosure, the user equipments 1, 2 and 3 finally determine to adopt the multiple access signatures 1, 2 and 3, respectively, for grant-free transmission. As such, the collision during the grant-free transmission is avoided.

(2) Embodiment 1-2

TABLE 3

| user equipment | index of the first multiple access signature | index of the second multiple access signature | intervention result |
|---|---|---|---|
| 1 | 1 | — | to adopt the first multiple access signature |
| 2 | 2 | — | to adopt the first multiple access signature |
| 3 | 3 | — | to adopt the first multiple access signature |
| 4 | 4 | — | — |

As shown in Table 3, the user equipment 1 selects a first multiple access signature of which an index is 1 at step 101 and sends the first multiple access signature with the index being 1 to the base station, the user equipment 2 selects a first multiple access signature of which an index is 2 at step 101 and sends the first multiple access signature with the index being 2 to the base station, the user equipment 3 selects a first multiple access signature of which an index is 3 at step 101 and sends the first multiple access signature with the index being 3 to the base station, and the user equipment 4 selects a first multiple access signature of which an index is 4 at step 101 and sends the first multiple access signature with the index being 4 to the base station.

The base station receives the first multiple access signatures from the above four user equipments at step 201.

At step 202, the base station predicts, according to the number of overlapped physical resource units of available physical resources indicated by the respective multiple access signatures shown in FIG. 3, mutual interference generated when the above four user equipments perform data transmission adopting their respective first multiple access signature, i.e., $I_{1-2}=I_{1-3}=I_{2-3}=0$ and $I_{1-4}=I_{2-4}=I_{3-4}=1$. Since $I_{1-2}=I_{1-3}=I_{2-3}=I_T$ and $I_{1-4}=I_{2-4}=I_{3-4}>I_T$, the base station determines, for each user equipment of which the mutual interference is predicted to be less than or equal to the preset threshold, i.e., the user equipments 1, 2 and 3, as shown in Table 3, to adopt the first multiple access signature as the intervention result for the user equipment.

In addition, for the user equipment 4 of which the mutual interference is predicted to be greater than the preset threshold, since the first multiple access signatures of the user equipments 1, 2 and 3 have covered all of the nine physical resource units, at step 203, no matter which multiple access signature is selected by the base station for the user equipment 4, the mutual interference between the user equipment 4 and the user equipments 1, 2 and 3 will not be less than or equal to the preset threshold. Thus, as shown in Table 3, the base station does not generate the intervention result for the user equipment 4.

The base station sends the intervention results for the user equipments 1, 2 and 3 at step 204.

The user equipment 1 receives the intervention result of the base station for it at step 102. The user equipment 1 determines, at step 103, to adopt the first multiple access signature, i.e., the multiple access signature with the index being 1, for data transmission.

The user equipment 2 receives the intervention result of the base station for it at step 102. The user equipment 2 determines, at step 103, to adopt the first multiple access signature, i.e., the multiple access signature with the index being 2, for data transmission.

The user equipment 3 receives the intervention result of the base station for it at step 102. The user equipment 3 determines, at step 104, to adopt the second multiple access signature, i.e., the multiple access signature with the index being 3, for data transmission.

The user equipment 4 does not receive an intervention result of the base station for it at step 102, and returns to step 101 to resend a first multiple access signature to the base station.

In this embodiment, the user equipments 1, 2, 3 and 4 are originally intended to adopt the multiple access signatures 1, 2, 3 and 4, respectively, for grant-free transmission, in which a collision may occur. By performing the grant-free transmission method of the present disclosure, the user equipments 1, 2 and 3 finally determine to adopt the multiple access signatures 1, 2 and 3, respectively, for grant-free transmission. The user equipment 4 is temporarily unable to perform grant-free transmission, and resends a first multiple access signature to the base station. As such, the collision during the grant-free transmission is avoided.

(3) Embodiment 1-3

TABLE 4

| user equipment | index of the first multiple access signature | index of the second multiple access signature | intervention result |
|---|---|---|---|
| 1 | 1 | — | to adopt the first multiple access signature |
| 2 | 2 | — | to adopt the first multiple access signature |
| 3 | 3 | — | to adopt the first multiple access signature |
| 4 | 2 | — | — |

As shown in Table 4, the user equipment 1 selects a first multiple access signature of which an index is 1 at step 101 and sends the first multiple access signature with the index being 1 to the base station, the user equipment 2 selects a first multiple access signature of which an index is 2 at step 101 and sends the first multiple access signature with the index being 2 to the base station, the user equipment 3 selects a first multiple access signature of which an index is 3 at step 101 and sends the first multiple access signature with the index being 3 to the base station, and the user equipment 4 selects a first multiple access signature of which an index is 2 at step 101 and sends the first multiple access signature with the index being 2 to the base station.

The base station receives the first multiple access signatures from the above four user equipments at step 201.

At step 202, the base station predicts, according to the number of overlapped physical resource units of available physical resources indicated by respective multiple access signatures shown in FIG. 3, mutual interference generated when the above four user equipments perform data transmission adopting their respective first multiple access signatures, i.e., $I_{1-2}=I_{1-3}=I_{1-4}=I_{2-3}=I_{3-4}=0$ and $I_{2-4}=3$. Since $I_{1-2}=I_{1-3}=I_{2-3}=I_T$ and $I_{24}>I_T$, the base station determines, for each user equipment of which the mutual interference is predicted to be less than or equal to the preset threshold, i.e., the user equipments 1, 2 and 3, as shown in Table 4, to adopt the first multiple access signature as the intervention result for the user equipment.

In addition, for the user equipment 4 of which the mutual interference is predicted to be greater than the preset threshold, since the first multiple access signatures of the user equipments 1, 2 and 3 have covered all of the nine physical resource units, at step 203, no matter which multiple access signature is selected by the base station for the user equipment 4, the mutual interference between the user equipment 4 and the user equipments 1, 2 and 3 will not be less than or equal to the preset threshold. Thus, as shown in Table 4, the base station does not generate the intervention result for the user equipment 4.

The base station sends the intervention results for the user equipments 1, 2 and 3 at step 204.

The user equipment 1 receives the intervention result of the base station for it at step 102. The user equipment 1 determines, at step 103, to adopt the first multiple access signature, i.e., the multiple access signature with the index being 1, for data transmission.

The user equipment 2 receives the intervention result of the base station for it at step 102. The user equipment 2 determines, at step 103, to adopt the first multiple access signature, i.e., the multiple access signature with the index being 2, for data transmission.

The user equipment 3 receives the intervention result of the base station for it at step 102. The user equipment 3 determines, at step 104, to adopt the second multiple access signature, i.e., the multiple access signature with the index being 3, for data transmission.

The user equipment 4 does not receive an intervention result of the base station for it at step 102, and returns to step 101 to resend a first multiple access signature to the base station.

In this embodiment, the user equipments 1, 2, 3 and 4 are originally intended to adopt the multiple access signatures 1, 2, 3 and 2, respectively, for grant-free transmission, in which a collision may occur. By performing the grant-free transmission method of the present disclosure, the user equipments 1, 2 and 3 finally determine to adopt the multiple access signatures 1, 2 and 3, respectively, for grant-free transmission. The user equipment 4 is temporarily unable to perform grant-free transmission, and resends the first multiple access signature to the base station. As such, the collision during the grant-free transmission is avoided.

It should be noted that, in this embodiment, since the first multiple access signatures selected by the user equipments 2 and 4 are identical, the above intervention results of the base station for the user equipments 2 and 4 may be interchanged. In other words, the intervention result for the user equipments 2 is not generated, and to adopt the first multiple access signature is determined as the intervention result for the user equipment 4. In this case, the collision during the grant-free transmission is also avoided.

It can be seen that, in the case of a high bit rate, by performing the grant-free transmission method of the present disclosure, the collision during the grant-free transmission is avoided. In addition, through the two-step signaling interaction between the user equipment and the base station, self-selection of the user equipment is combined with intervention of the base station to determine the multiple access signature used for data transmission, so that the collision during the grant-free transmission is avoided with less signaling overhead.

2. Low Bit Rate Situation

As mentioned in the foregoing, in the case of a low bit rate, a relatively high threshold may be preset to indicate the mutual interference allowed by the system. In this case, $I_T$ is preset as 1, which means that a low degree of collision is allowed.

(1) Embodiment 2-1

TABLE 5

| user equipment | index of the first multiple access signature | index of the second multiple access signature | intervention result |
|---|---|---|---|
| 1 | 1 | — | to adopt the first multiple access signature |
| 2 | 2 | — | to adopt the first multiple access signature |
| 3 | 4 | — | to adopt the first multiple access signature |

As shown in Table 5, the user equipment 1 selects a first multiple access signature of which an index is 1 at step 101 and sends the first multiple access signature with the index being 1 to the base station, the user equipment 2 selects a first multiple access signature of which an index is 2 at step 101 and sends the first multiple access signature with the index being 2 to the base station, and the user equipment 3 selects a first multiple access signature of which an index is 4 at step 101 and sends the first multiple access signature with the index being 4 to the base station.

The base station receives the first multiple access signatures from the above three user equipments at step 201.

At step 202, the base station predicts, according to the number of overlapped physical resource units of available physical resources indicated by respective multiple access signatures shown in FIG. 3, mutual interference generated when the above three user equipments perform data transmission adopting their respective first multiple access signature, i.e., $I_{1-2}=0$ and $I_{1-3}=I_{2-3}=1$. Since $I_{1-2}<I_T$ and $I_{1-3}=I_{2-3}=I_T$, the base station determines, for each user equipment of which the mutual interference is predicted to be less than or equal to the preset threshold, i.e., the user equipments 1, 2 and 3, as shown in Table 5, to adopt the first multiple access signature as the intervention result for the user equipment.

The base station sends the intervention results for the user equipments 1, 2 and 3 at step 204.

The user equipment 1 receives the intervention result of the base station for it at step 102. The user equipment 1 determines, at step 103, to adopt the first multiple access signature, i.e., the multiple access signature with the index 1, for data transmission.

The user equipment 2 receives the intervention result of the base station for it at step 102. The user equipment 2 determines, at step 103, to adopt the first multiple access signature, i.e., the multiple access signature with the index being 2, for data transmission.

The user equipment 3 receives the intervention result of the base station for it at step 102. The user equipment 3 determines, at step 103, to adopt the first multiple access signature, i.e., the multiple access signature with the index being 4, for data transmission.

In this embodiment, same as the embodiment 1-1, the user equipments 1, 2 and 3 are originally intended to adopt the multiple access signatures 1, 2 and 4, respectively, for grant-free transmission, in which a low degree of collision may occur. However, since the present embodiment is in the low bit rate situation, and the system can tolerate the relatively low degree of collision, by performing the grant-free transmission method of the present disclosure, the user equipments 1, 2 and 3 finally still determine to adopt the multiple access signatures 1, 2 and 4, respectively, for grant-free transmission.

(2) Embodiment 2-2

TABLE 6

| user equipment | index of the first multiple access signature | index of the second multiple access signature | intervention result |
|---|---|---|---|
| 1 | 1 | — | to adopt the first multiple access signature |
| 2 | 2 | — | to adopt the first multiple access signature |
| 3 | 5 | 3 | to adopt the second multiple access signature |

As shown in Table 6, the user equipment 1 selects a first multiple access signature of which an index is 1 at step 101 and sends the first multiple access signature with the index being 1 to the base station, the user equipment 2 selects a first multiple access signature of which an index is 2 at step 101 and sends the first multiple access signature with the index being 2 to the base station, and the user equipment 3 selects a first multiple access signature of which an index is 5 at step 101 and sends the first multiple access signature with the index 5 to the base station.

The base station receives the first multiple access signatures from the above three user equipments at step 201.

At step 202, the base station predicts, according to the number of overlapped physical resource units of available physical resources indicated by the respective multiple access signatures shown in FIG. 3, mutual interference generated when the above three user equipments perform data transmission adopting their respective first multiple access signatures, i.e., $I_{1-2}=I_{1-3}=0$ and $I_{2-3}=2$. Since $I_{1-2}<I_T$ and $I_{2-3}>I_T$, the base station determines, for each user equipment of which the mutual interference is predicted to be less than or equal to the preset threshold, i.e., the user equipments 1 and 2, as shown in Table 6, to adopt the first multiple access signature as the intervention result for the user equipment.

In this case, although $I_{1-3}<I_T$, and since the indexes of the first multiple access signatures of the user equipments 1 and 2 are 1 and 2 which belong to a first group, respectively, while the index of the first multiple access signature of the user equipment 3 is 5 which belongs to a second group, and mutual interference generated when adopting respective multiple access signatures in the same group is less than or equal to mutual interference generated when adopting respective multiple access signature in different groups, the user equipment 2, instead of the user equipment 3, is predicted to be a user equipment of which the mutual interference is less than or equal to the preset threshold.

In addition, for the user equipment 3 of which the mutual interference is predicted to be greater than the preset threshold, as shown in Table 6, the base station selects a multiple access signature of which an index is 3 as a second multiple access signature for the user equipment 3 at step 203. As such, when the user equipment 3 adopts the second multiple access signature, $I_{1-3}=I_{2-3}=0<I_T$, and to adopt the second multiple access signature is determined as the intervention result for the user equipment 3.

The base station sends the intervention results for the user equipments 1, 2 and 3 at step 204.

The user equipment 1 receives the intervention result of the base station for it at step 102. The user equipment 1 determines, at step 103, to adopt the first multiple access signature, i.e., the multiple access signature with the index being 1, for data transmission.

The user equipment 2 receives the intervention result of the base station for it at step 102. The user equipment 2 determines, at step 103, to adopt the first multiple access signature, i.e., the multiple access signature with the index being 2, for data transmission.

The user equipment 3 receives the intervention result of the base station for it at step 102. The user equipment 3 determines, at step 104, to adopt the second multiple access signature, i.e., the multiple access signature with the index being 3, for data transmission.

In this embodiment, the user equipments 1, 2 and 3 are originally intended to adopt the multiple access signatures 1, 2 and 5, respectively, for grant-free transmission, in which a relatively high degree of collision may occur. By performing the grant-free transmission method of the present disclosure, the user equipments 1, 2 and 3 finally determine to adopt the multiple access signatures 1, 2 and 3, respectively, for grant-free transmission. As such, the collision during the grant-free transmission is avoided.

(3) Embodiment 2-3

TABLE 7

| user equipment | index of the first multiple access signature | index of the second multiple access signature | intervention result |
|---|---|---|---|
| 1 | 1 | — | to adopt the first multiple access signature |
| 2 | 2 | — | to adopt the first multiple access signature |
| 3 | 3 | — | to adopt the first multiple access signature |

TABLE 7-continued

| user equipment | index of the first multiple access signature | index of the second multiple access signature | intervention result |
|---|---|---|---|
| 4 | 4 | — | to adopt the first multiple access signature |

As shown in Table 7, the user equipment 1 selects a first multiple access signature of which an index is 1 at step 101 and sends the first multiple access signature with the index being 1 to the base station, the user equipment 2 selects a first multiple access signature of which an index is 2 at step 101 and sends the first multiple access signature with the index being 2 to the base station, the user equipment 3 selects a first multiple access signature of which an index is 3 at step 101 and sends the first multiple access signature with the index being 3 to the base station, and the user equipment 4 selects a first multiple access signature of which an index is 4 at step 101 and sends the first multiple access signature with the index being 4 to the base station.

The base station receives the first multiple access signatures from the above four user equipments at step 201.

At step 202, the base station predicts, according to the number of overlapped physical resource units of available physical resources indicated by the respective multiple access signatures shown in FIG. 3, mutual interference generated when the above four user equipments perform data transmission adopting their respective first multiple access signatures, i.e., $I_{1-2}=I_{1-3}=I_{2-3}=0$ and $I_{1-4}=I_{2-4}=I_{3-4}=1$. Since $I_{1-2}=I_{1-3}=I_{2-3}<I_T$ and $I_{1-4}=I_{2-4}=I_{3-4}=I_T$, the base station determines, for each user equipment of which the mutual interference is predicted to be less than or equal to the preset threshold, i.e., the user equipments 1, 2, 3 and 4, as shown in Table 7, to adopt the first multiple access signature as the intervention result for the user equipment.

The base station sends the intervention results for the user equipments 1, 2, 3 and 4 at step 204.

The user equipment 1 receives the intervention result of the base station for it at step 102. The user equipment 1 determines, at step 103, to adopt the first multiple access signature, i.e., the multiple access signature with the index being 1, for data transmission.

The user equipment 2 receives the intervention result of the base station for it at step 102. The user equipment 2 determines, at step 103, to adopt the first multiple access signature, i.e., the multiple access signature with the index being 2, for data transmission.

The user equipment 3 receives the intervention result of the base station for it at step 102. The user equipment 3 determines, at step 103, to adopt the first multiple access signature, i.e., the multiple access signature with the index being 3, for data transmission.

The user equipment 4 receives the intervention result of the base station for it at step 102. The user equipment 4 determines, at step 103, to adopt the first multiple access signature, i.e., the multiple access signature with the index being 4, for data transmission.

In this embodiment, the user equipments 1, 2, 3 and 4 are originally intended to adopt the multiple access signatures 1, 2, 3 and 4, respectively, for grant-free transmission, in which a relatively low degree of collision may occur. However, since the present embodiment is in the low bit rate situation, and the system can tolerate a relatively low degree of collision, by performing the grant-free transmission method of the present disclosure, the user equipments 1, 2, 3 and 4 finally still determine to adopt the multiple access signatures 1, 2, 3 and 4, respectively, for grant-free transmission.

(4) Embodiment 2-4

TABLE 8

| user equipment | index of the first multiple access signature | index of the second multiple access signature | intervention result |
|---|---|---|---|
| 1 | 1 | — | to adopt the first multiple access signature |
| 2 | 2 | — | to adopt the first multiple access signature |
| 3 | 3 | — | to adopt the first multiple access signature |
| 4 | 4 | — | to adopt the first multiple access signature |
| 5 | 5 | — | — |

As shown in Table 8, the user equipment 1 selects a first multiple access signature of which an index is 1 at step 101 and sends the first multiple access signature with the index being 1 to the base station, the user equipment 2 selects a first multiple access signature of which an index is 2 at step 101 and sends the first multiple access signature with the index being 2 to the base station, the user equipment 3 selects a first multiple access signature of which an index is 3 at step 101 and sends the first multiple access signature with the index being 3 to the base station, the user equipment 4 selects a first multiple access signature of which an index is 4 at step 101 and sends the first multiple access signature with the index being 4 to the base station, and the user equipment 5 selects a first multiple access signature of which an index is 5 at step 101 and sends the first multiple access signature with the index being 5 to the base station.

The base station receives the first multiple access signatures from the above five user equipments at step 201.

At step 202, the base station predicts, according to the number of overlapped physical resource units of available physical resources indicated by the respective multiple access signatures shown in FIG. 3, mutual interference generated when the above five user equipments perform data transmission adopting their respective first multiple access signatures, i.e., $I_{1-2}=I_{1-3}=I_{2-3}=I_{1-5}=I_{4-5}=0$, $I_{1-4}=I_{2-4}=I_{3-4}=I_{3-5}=1$ and $I_{2-5}=2$. Since $I_{1-2}=I_{1-3}=I_{2-3}=I_{1-5}=I_{4-5}<I_T$, $I_{1-4}=I_{2-4}=I_{3-4}=I_{3-5}=I_T$ and $I_{2-5}>I_T$, the base station determines, for each user equipment of which the mutual interference is predicted to be less than or equal to the preset threshold, i.e., the user equipments 1, 2, 3 and 4, as shown in Table 8, to adopt the first multiple access signature as the intervention result for the user equipment.

In this case, since the index of the first multiple access signature of the user equipment 2 is 2 which belongs to the first group to which the first multiple access signatures (1, 3) of the user equipments 1 and 3 belong, while the index of the first multiple access signature of the user equipment 5 is 5 which belongs to the second group, mutual interference generated when adopting respective multiple access signatures in a same group is less than or equal to mutual interference generated when adopting respective multiple access signatures in different groups, the user equipment 2, instead of the user equipment 5, is predicted to be a user equipment of which the mutual interference is less than or equal to the preset threshold.

In addition, for the user equipment 5 of which the mutual interference is predicted to be greater than the preset threshold, since $I_{1-6}=2>I_T$ when the multiple access signature 6 left only is adopted, the base station is unable to select, at step 203, a multiple access signature causing the mutual interference between the user equipment 5 and the user equipments 1, 2, 3 and 4 to be less than or equal to the preset threshold, as shown in Table 8, the base station does not generate an intervention result for the user equipment 5.

The base station sends the intervention results for the user equipments 1, 2, 3 and 4 at step 204.

The user equipment 1 receives the intervention result of the base station for it at step 102. The user equipment 1 determines, at step 103, to adopt the first multiple access signature, i.e., the multiple access signature with the index being 1, for data transmission.

The user equipment 2 receives the intervention result of the base station for it at step 102. The user equipment 2 determines, at step 103, to adopt the first multiple access signature, i.e., the multiple access signature with the index being 2, for data transmission.

The user equipment 3 receives the intervention result of the base station for it at step 102. The user equipment 3 determines, at step 103, to adopt the first multiple access signature, i.e., the multiple access signature with the index being 3, for data transmission.

The user equipment 4 receives the intervention result of the base station for it at step 102. The user equipment 4 determines, at step 103, to adopt the first multiple access signature, i.e., the multiple access signature with the index being 4, for data transmission.

In this embodiment, the user equipments 1, 2, 3, 4 and 5 are originally intended to adopt the multiple access signatures 1, 2, 3, 4 and 5, respectively, for grant-free transmission, in which a relatively high degree of collision may occur. By performing the grant-free transmission method of the present disclosure, the user equipments 1, 2, 3 and 4 finally still determine to adopt the multiple access signatures 1, 2, 3 and 4, respectively, for grant-free transmission. The user equipment 5 is temporarily unable to perform the grant-free transmission, and resends a first multiple access signature to the base station. As such, a relatively high degree of collision that may occur is transformed into a relatively low degree of collision that may occur, i.e., the collision during the grant-free transmission is reduced.

It can be seen that, in the case of a low bit rate, by performing the grant-free transmission method of the present disclosure, the collision during the grant-free transmission is avoided or reduced. In addition, through the two-step signaling interaction between the user equipment and the base station, self-selection of the user equipment is combined with intervention of the base station to determine the multiple access signature used for data transmission, so that the collision during the grant-free transmission is avoided or reduced with less signaling overhead.

Corresponding to the above grant-free transmission method at the user equipment side, embodiments of the present disclosure further provide a user equipment. FIG. 4 is a schematic diagram illustrating the components of the user equipment according to an embodiment of the present disclosure. The user equipment includes:

a multiple access signature sending unit 401 to send a first multiple access signature selected by the user equipment to a base station;

an intervention result receiving unit 402 to receive an intervention result of the base station for the user equipment; and a multiple access signature determining unit 403 to determine, when the intervention result is to adopt the first multiple access signature, to adopt the first multiple access signature for data transmission, and determine, when the intervention result is to adopt a second multiple access signature, to adopt the second multiple access signature for the data transmission.

The multiple access signature sending unit 401 is further to send the first multiple access signature to the base station through a random access request.

The intervention result receiving unit 402 is further to inform the multiple access signature sending unit 401 to resend the first multiple access signature to the base station when the intervention result of the base station for the user equipment is not received within a preset period of time.

The intervention result receiving unit 402 is further to receive the intervention result of the base station for the user equipment through a random access response. The multiple access signature determining unit 403 is to acquire the second multiple access signature through the random access response.

In an example, the user equipment in the embodiment of the present disclosure may be provided with a processor and a non-transitory machine-readable storage medium storing a program. Each of the above units 401-403 may be implemented by executing, by the processor, the program stored in the non-transitory machine-readable storage medium.

Specific operations of the user equipment in the embodiment of the present disclosure may refer to the processes shown in FIG. 1.

Figure 5:
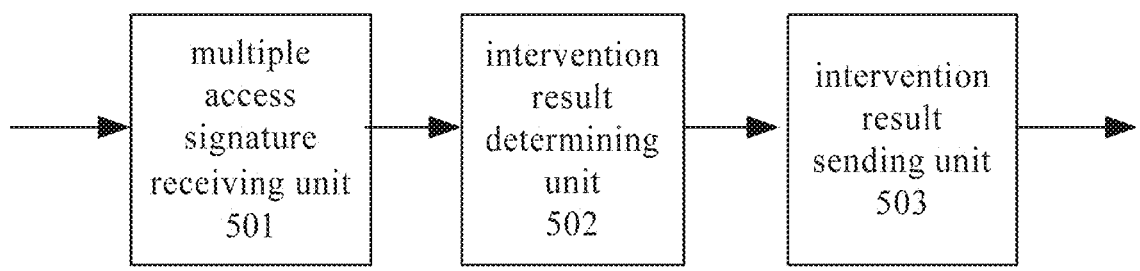
FIG. 5 is a schematic diagram illustrating the components of a base station according to an embodiment of the present disclosure.

Corresponding to the above grant-free transmission method at the base station side, embodiments of the present disclosure further provide a base station. FIG. 5 is a schematic diagram illustrating the components of the base station according to an embodiment of the present disclosure. The base station includes:

a multiple access signature receiving unit 501 to receive, from respective user equipments, first multiple access signatures selected by the respective user equipments;

an intervention result determining unit 502 to predict mutual interference caused by data transmission performed simultaneously by the respective user equipments using the first multiple access signatures of the respective user equipments, determine a respective user equipment of which mutual interference is predicted to be higher than a predetermined level as a user equipment to be intervened, determine, for a respective user equipment of which mutual interference is predicted to be not higher than the predetermined level, that to adopt a first multiple access signature of the respective user equipment of which the mutual interference is predicted to be not higher than the predetermined level is an intervention result for the respective user equipment of which the mutual interference is predicted to be not higher than the predetermined level, select, for a respective user equipment to be intervened, a multiple access signature capable of making the mutual interference not higher than the predetermined level as a second multiple access signature, and determine that to adopt the second multiple access signature is an intervention result for the respective user equipment; and an intervention result sending unit 503 to send intervention results to the respective user equipments.

The multiple access signature receiving unit 501 is further to receive the first multiple access signatures of the respective user equipments through random access requests sent by the respective user equipments.

The multiple access signature receiving unit 501 is further to, when a first multiple access signature of a user equipment is unable to be acquired through a random access request sent by the user equipment and when a preamble and/or an ID of the user equipment included in the random access request sent by the user equipment are detected, determine the user equipment as a user equipment to be intervened, or otherwise, ignore the random access request sent by the user equipment.

The multiple access signature receiving unit 501 is further to, when a first multiple access signature of a user equipment is unable to be acquired through a random access request sent by the user equipment, ignore the random access request sent by the user equipment.

The intervention result determining unit 502 is further to, when a multiple access signature capable of making the mutual interference not higher than a predetermined level is unable to be selected for the user equipment to be intervened, not generate an intervention result for the user equipment to be intervened.

The intervention result determining unit 502 is further to, when a multiple access signature capable of making the mutual interference not higher than a predetermined level is unable to be selected for the user equipment to be intervened, select a multiple access signature capable of minimizing the mutual interference as a second multiple access signature, and determine to adopt the second multiple access signature as the intervention result for the user equipment to be intervened.

The intervention result sending unit 503 is further to send the intervention results for the respective user equipments through random access responses.

In an example, the base station in the embodiment of the present disclosure may be provided with a processor and a non-transitory machine-readable storage medium storing an program. Each of the above units 501-503 may be implemented by executing, by the processor, the program stored in the non-transitory machine-readable storage medium.

Specific operations of the base station in the embodiment of the present disclosure may refer to the processes shown in FIG. 2.

According to the user equipment and base station in the embodiments of the present disclosure, through two-step signaling interactions between the user equipment and the base station, self-selection of the user equipment is combined with intervention of the base station to determine the multiple access signature used for data transmission, so that the collision during the grant-free transmission is avoided or reduced with less signaling overhead.

In addition, the user equipment and the base station in the embodiments of the present disclosure may implement the two-step signaling interaction using an existing random access procedure, so that an existing equipment may be utilized to the greatest extent, thereby reducing the cost.

<Hardware Structure>

In addition, the block diagrams that have been used to describe the above embodiments illustrate blocks in functional units. These functional blocks (components) may be implemented in arbitrary combinations of hardware and/or software. Also, the means for implementing each functional block is not particularly limited. That is, each functional block may be implemented by one piece of apparatus that is physically and/or logically aggregated, or may be implemented by directly and/or indirectly connecting two or more physically and/or logically separate pieces of apparatus (via wire or wireless, for example) and using these multiple pieces of apparatus.

Figure 6:
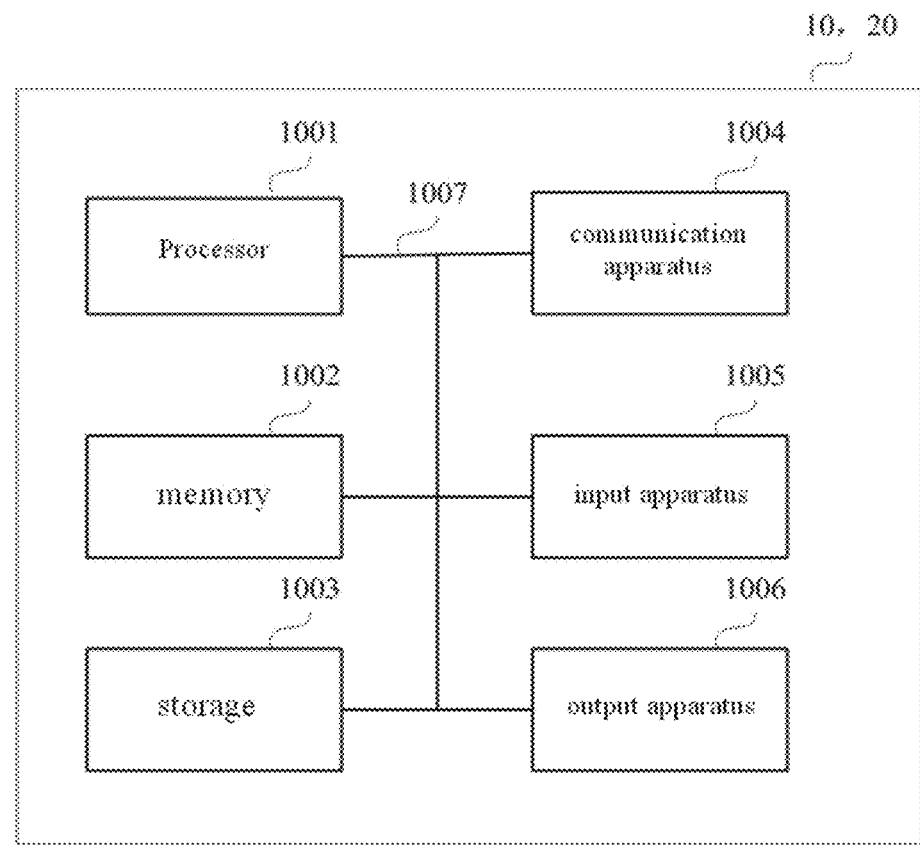
FIG. 6 is a diagram illustrating an example of a hardware structure of a base station and a user equipment according to an embodiment of the present disclosure.

For example, a radio base station, a user equipment and so on according to an embodiment of the present disclosure may function as a computer that executes the processes of the radio communication method of the present disclosure. FIG. 6 is a diagram to illustrate an example hardware structure of a radio base station and a user equipment according to an embodiment of the present disclosure. Physically, the above-described radio base station 10 and user equipment 20 may be formed as a computer apparatus that includes a processor 1001, a memory 1002, a storage 1003, a communication apparatus 1004, an input apparatus 1005, an output apparatus 1006 and a bus 1007.

In addition, in the following description, the word "apparatus" may be replaced by "circuit", "device", "unit", and so on. Note that the hardware structures of a radio base station 10 and a user equipment 20 may be designed to include one or more of each apparatus illustrated in the drawing, or may be designed not to include a part of the apparatus.

For example, although only one processor 1001 is illustrated, a plurality of processors may be provided. Furthermore, processes may be implemented with one processor, or processes may be implemented in sequence, or in different manners, on more than one processor. Note that the processor 1001 may be implemented with more than one chip.

Each function of the radio base station 10 and the user equipment 20 is implemented for example by reading predetermined software (programs) on hardware such as the processor 1001 and the memory 1002, so as to allow the processor 1001 to do calculations to control communications performed by the communication apparatus 1004, and control reading and/or writing data from the memory 1002 and the storage 1003.

The processor 1001 may control the whole computer by, for example, running an operating system. The processor 1001 may be formed with a central processing unit (CPU) which includes interfaces with a peripheral apparatus, a control apparatus, a computing apparatus, a register, and so on.

Furthermore, the processor 1001 reads programs (program codes), software modules or data, from the storage 1003 and/or the communication apparatus 1004, into the memory 1002, and executes various processes according to them. As the programs, programs that allow a computer to execute at least part of the operations of the above-described embodiments may be used.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as "register", "cache", "main memory (primary storage apparatus)", and so on. The memory 1002 may store executable programs (program codes), software modules, and so on for implementing the radio communication methods according to embodiments of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disk ROM), and so on), a digital versatile disc, a Blu-ray (registered trademark) disk), a removable disk, a hard disk driver, a smart card, a flash memory device (for example, a card, a stick, a key driver, etc.), a magnetic stripe, a database, a server, and/or other appropriate storage media. The storage 1003 may be referred to as "secondary storage apparatus".

The communication apparatus 1004 is hardware (transmitting/receiving device) for allowing inter-computer communications by using wired and/or wireless networks, and may be referred to as, for example, "network device", "network controller", "network card", "communication module", and so on. The communication apparatus 1004 may include a high frequency switch, a duplexer, a filter, a frequency synthesizer, and so on, in order to realize, for example, frequency division duplex (FDD) and/or time division duplex (TDD).

The input apparatus 1005 is an input device for receiving input from the outside (for example, a keyboard, a mouse, a microphone, a switch, a button, a sensor, and so on). The output apparatus 1006 is an output device that implements output to the outside (for example, a display, a speaker, an LED (Light Emitting Diode) lamp, and so on). The input apparatus 1005 and the output apparatus 1006 may be provided in an integrated structure (for example, a touch panel).

Furthermore, the pieces of apparatus such as the processor 1001, the memory 1002 and others, are connected by the bus 1007 for communicating information. The bus 1007 may be formed with a single bus, or may be formed with different buses between pieces of apparatus.

Also, the radio base station 10 and the user equipment 20 may be structured to include hardware such as a microprocessor, a digital signal processor (DSP), an ASIC (Application-Specific Integrated Circuit), a PLD (Programmable Logic Device), and an FPGA (Field Programmable Gate Array), and so on, and part or all of the functional blocks may be implemented by the hardware. For example, the processor 1001 may be implemented with at least one of these pieces of hardware.

(Variations)

In addition, the terminology used in this specification and the terminology that is needed to understand this specification may be replaced by other terms that convey the same or similar meanings. For example, "channel" and/or "symbol" may be replaced by "signal (or "signaling")." Also, "signal" may be "message". "Reference signal" may be abbreviated as "RS", and may be referred to as "pilot", "pilot signal", and so on, depending on which standard applies. Furthermore, "component carrier (CC)" may be referred to as "cell", "frequency carrier", "carrier frequency", and so on.

Furthermore, a radio frame may be constituted by one or more periods (frames) in the time domain. Each of the one or more periods (frames) constituting the radio frame may be referred to as a subframe. Furthermore, a subframe may be constituted by one or more slots in the time domain. The subframe may be a fixed length of time (e.g., 1 ms) independent of the numerology.

Furthermore, a slot may be constituted by one or more symbols (OFDM (Orthogonal Frequency Division Multiplexing) symbols, SC-FDMA (Single Carrier Frequency Division Multiple Access) symbols, and so on) in the time domain. In addition, the time slot may also be a time unit based on the numerology. Also, the time slot may also include a plurality of minislots. Each minislot may be constituted by one or more symbols in the time domain. In addition, a minislot may also be referred to as a subslot.

"radio frame", "subframe", "slot", "minislot" and "symbol" all represent time units in signal communication. "radio frame", "subframe", "slot", "minislot" and "symbol" may be each called by other applicable names. For example, one subframe may be referred to as a transmission time interval (TTI), a plurality of consecutive subframes may be referred to as a TTI, or one slot or one minislot may be referred to as a TTI. That is, a subframe and/or a TTI may be a subframe (1 ms) in existing LTE, may be a period shorter than 1 ms (for example, one to thirteen symbols), or may be a period longer than 1 ms. In addition, a unit indicating a TTI may also be referred to as a slot, a minislot, or the like, instead of a subframe.

Herein, a TTI refers to the minimum time unit of scheduling in radio communication. For example, in LTE systems, a radio base station schedules the allocation of radio resources (such as the frequency bandwidth and transmission power that can be used by each user equipment) for each user equipment in TTI units. In addition, the definition of TTI is not limited to this.

The TTI may be the transmission time unit of channel-encoded data packets (transport blocks), code blocks and/or codewords, or may be the processing unit of scheduling, link adaptation, and so on. In addition, when a TTI is given, a time interval (e.g., the number of symbols) actually mapped to the transport blocks, code blocks, and/or codewords may also be shorter than the TTI.

In addition, when one time slot or one mini time slot is called a TTI, more than one TTI (i.e., more than one time slot or more than one mini time slot) may also be a minimum time unit for scheduling. Further, the number of slots (the number of minislots) constituting the minimum time unit for scheduling can be controlled.

A TTI having a time length of 1 ms may be referred to as a normal TTI (TTI in LTE Rel. 8 to 12), a standard TTI, a long TTI, a normal subframe, a standard subframe, or a long subframe, and so on. A TTI that is shorter than the normal TTI may be referred to as a compressed TTI, a short TTI, a partial TTI/fractional TTI, a compressed subframe, a short subframe, a mini time slot, or a subslot, and so on.

In addition, a long TTI (e.g., a normal TTI, a subframe, etc.) may be replaced with a TTI having a time length exceeding 1 ms, and a short TTI (e.g., a compressed TTI, etc.) may also be replaced with a TTI having a TTL length shorter than that of a long TTI and longer than 1 ms.

A resource block (RB) is the unit of resource allocation in the time domain and the frequency domain, and may include one or a plurality of consecutive subcarriers in the frequency domain. In addition, an RB may include one or more symbols in the time domain, and may be one slot, one minislot, one subframe, or one TTI in length. One TTI and one subframe each may be constituted by one or more resource blocks. Besides, one or more RBs may be referred to as a Physical RB (PRB), a Sub-Carrier Group (SCG), a Resource Element Group (REG), a PRB pair, an RB pair, and so on.

Furthermore, a resource block may be constituted by one or more resource elements (REs). For example, one RE may be a radio resource field of one subcarrier and one symbol.

In addition, the above-described structures of the radio frame, the subframe, the slot, the minislot, the symbol, and so on are merely examples. For example, configurations such as the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration and the cyclic prefix (CP) duration may be changed in various ways.

Further, the information and parameters described in this specification may be represented in absolute values, or in relative values with respect to predetermined values, or may be represented in other information formats. For example, radio resources may be indicated by predetermined indexes.

In addition, equations to use these parameters and so on may be different from those explicitly disclosed in this specification.

The names used for the parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and so on described in this specification may be represented by using a variety of different technologies. For example, the data, commands, instructions, information, signals, bits, symbols and chips, all of which may be referenced throughout the herein-contained description, may be represented by voltages, currents, electromagnetic waves, magnetic fields or particles, optical fields or photons, or any combination of these.

Also, the information, signals, and so on may be output from higher layers to lower layers and/or from lower layers to higher layers. The information, signals, and so on may be input and output via a plurality of network nodes.

The information, signals, and so on that are input and/or output may be stored in a specific location (for example, a memory), or may be managed using a management table. The information, signals, and so on to be input and/or output can be overwritten, updated or appended. The information, signals, and so on that are output may be deleted. The information, signals, and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," and so on. Also, RRC signaling may be referred to as "RRC messages", and may be, for example, an RRC connection setup message, an RRC connection reconfiguration message, and so on. Also, MAC signaling may be reported using, for example, MAC control elements (MAC CEs).

Also, reporting of predetermined information (for example, reporting "is X") does not necessarily have to be sent explicitly, and may be sent implicitly (by, for example, not reporting the predetermined information or by reporting other information).

Decisions may be made in values represented by one bit (0 or 1), may be made in Boolean values that represent true or false, or may be made by comparing numerical values (for example, comparison against a predetermined value).

Software, whether it is referred to as "software", "firmware", "middleware", "microcode", or "hardware description language", or called by other names, should be interpreted broadly, to mean instructions, instruction sets, codes, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)", "radio base station", "eNB", "cell", "sector", "cell group", "carrier", and "component carrier" may be used interchangeably. A base station may be referred to as a "fixed station", "NodeB", "eNodeB (eNB)", "access point", "transmission point", "receiving point", "femto cell", "small cell", and so on.

A base station can accommodate one or more (for example, three) cells (also referred to as "sectors"). When a base station accommodates a plurality of cells, the entire coverage area of the base station may be partitioned into multiple smaller areas, and each smaller area may provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)", "user terminal", "user equipment (UE)" and "equipment" may be used interchangeably. "Base station" may be referred to as "fixed station", "NodeB", "eNodeB (eNB)", "access point", "transmission point", "receiving point", "femto cell", "small cell", and so on.

"Mobile station" may be referred to, by a person skilled in the art, as "subscriber station", "mobile unit", "subscriber unit", "wireless unit", "remote unit", "mobile device", "wireless device", "wireless communication device", "remote device", "mobile subscriber station", "access equipment", "mobile equipment", "wireless equipment", "remote equipment", "handset", "user agent", "mobile client", "client" or some other suitable terms.

Furthermore, the radio base stations in this specification may be interpreted as user equipments. For example, each aspect/embodiment of the present disclosure may be applied to a configuration in which communications between a radio base station and a user equipment are replaced with communications between a plurality of user equipments (D2D (Device-to-Device)). In this case, the user equipment 20 may have the functions of the radio base station 10 described above. In addition, wording such as "uplink" and "downlink" may be interpreted as "side". For example, an uplink channel may be interpreted as a side channel.

Likewise, the user equipments in this specification may be interpreted as radio base stations. In this case, the radio base station 10 may have the functions of the user equipment 20 described above.

Certain actions which have been described in this specification to be performed by base stations may, in some cases, be performed by upper nodes. In a network consisting of one or more network nodes with base stations, it is clear that various operations that are performed to communicate with the user equipments can be performed by base stations, one or more other network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, and/or next-generation systems that are enhanced based on these.

The phrase "based on" as used in this specification does not mean "based only on", unless otherwise specified. In other words, the phrase "based on" means both "based only on" and "based at least on".

Reference to elements with designations such as "first", "second", and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The term "determining" as used herein may encompass a wide variety of actions. For example, to "determining" as used herein may be interpreted to mean making determinations related to calculating, computing, processing, deriving, investigating, looking up (for example, searching a table, a database or some other data structure), ascertaining, and so on. Furthermore, to "determining" as used herein may be interpreted to mean making determinations related to receiving (for example, receiving information), transmitting (for example, transmitting information), inputting, outputting, accessing (for example, accessing data in a memory), and so on. In addition, to "determining" as used herein may be interpreted to mean making determinations related to resolving, selecting, choosing, establishing, comparing, and so on. In other words, to "determining" as used herein may be interpreted to mean making determinations related to some actions.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access. As used herein, two elements may be considered "connected" or "coupled" to each other by using one or more electrical wires, cables and/or printed electrical connections, and, in a number of non-limiting and non-inclusive examples, by using electromagnetic energy such as electromagnetic energy having wavelengths in the radio frequency, microwave and/or optical regions (both visible and invisible).

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Although the present disclosure has been described in detail above, it should be obvious to a person skilled in the art that the present disclosure is by no means limited to the embodiments described herein. The present disclosure can be implemented with various corrections and in various modifications, without departing from the spirit and scope of the present disclosure defined by the recitations of claims. Consequently, the description herein is provided only for the purpose of explaining examples, and should by no means be construed to limit the present disclosure in any way.

The invention claimed is:

1. A grant-free transmission method, comprising:
step a, sending a first multiple access signature selected by a user equipment to a base station;
step b, receiving an intervention result of the base station for the user equipment;
step c, determining, in response to that the intervention result is to adopt the first multiple access signature, to adopt the first multiple access signature for data transmission; and
step d, determining, in response to that the intervention result is to adopt a second multiple access signature, to adopt the second multiple access signature for the data transmission;
wherein the step a comprises:
sending the first multiple access signature to the base station through a random access request; and
the step a further comprises:
selecting, according to predefined correspondence between indexes of multiple access signatures and combinations of physical resources used by random access requests, and at least one of preamble indexes or IDs of user equipments, a first combination from more than one combination corresponding to an index of the first multiple access signature;
including, in the random access request, at least one of a preamble corresponding to a preamble index in the first combination or an ID of the user equipment in the first combination; and
sending the random access request to the base station using a physical resource in the first combination.

2. The method of claim 1, wherein the step a comprises:
including an index of the first multiple access signature into the random access request.

3. The method of claim 1, wherein the step a comprises:
selecting, according to predefined correspondence between first parts of indexes of multiple access signatures and combinations of physical resources used by random access requests, and at least one of preamble indexes or IDs of user equipments, a first combination from more than one combination corresponding to a first part of an index of the first multiple access signature;
including, in the random access request, at least one of a preamble corresponding to a preamble index in the first combination or an ID of the user equipment in the first combination, and a second part of the index of the first multiple access signature; and sending the random access request to the base station using a physical resource in the first combination.

4. The method of claim 1,
wherein the step b comprises:
receiving the intervention result of the base station for the user equipment through a random access response;
wherein the step d comprises:
acquiring the second multiple access signature through the random access response.

5. The method of claim 4, wherein the step d comprises:
determining, according to predefined correspondence between indexes of multiple access signatures and physical resources used by random access responses, an index of a multiple access signature corresponding to a physical resource used by the received random access response as an index of the second multiple access signature; and
acquiring the second multiple access signature according to the index of the second multiple access signature.

6. The method of claim 4, wherein the step d comprises:
calculating an index of the second multiple access signature, according to an index of the first multiple access signature and an offset between the index of the second multiple access signature and the index of the first multiple access signature included in the received random access response; and
acquiring the second multiple access signature according to the index of the second multiple access signature.

7. A grant-free transmission method, comprising:
step A, receiving, from respective user equipments, first multiple access signatures selected by the respective user equipments;
step B, predicting mutual interference caused by data transmission performed simultaneously by the respective user equipments using the first multiple access signatures of the respective user equipments, determining a respective user equipment of which mutual interference is predicted to be higher than a predetermined level as a user equipment to be intervened, and determining, for a respective user equipment of which mutual interference is predicted to be not higher than the predetermined level, that to adopt a first multiple access signature of the respective user equipment of which the mutual interference is predicted to be not higher than the predetermined level is an intervention result for the respective user equipment of which the mutual interference is predicted to be not higher than the predetermined level;
step C, for a respective user equipment to be intervened, selecting a multiple access signature capable of making the mutual interference not higher than the predetermined level as a second multiple access signature of the respective user equipment to be intervened, and determining that to adopt the second multiple access signature is an intervention result for the respective use equipment to be intervened; and
step D, sending intervention results for the respective user equipments.

8. The method of claim 7, wherein the step A comprises:
receiving the first multiple access signatures of the respective user equipments through random access requests sent by the respective user equipments.

9. The method of claim 8, wherein the step A comprises:
for a respective user equipment, determining, according to predefined correspondence between indexes of multiple access signatures and combinations of physical resources used by random access requests, and at least one of preamble indexes or IDs of user equipments, an index of a multiple access signature corresponding to a combination of a physical resource used by a random access request sent by the respective user equipment, and at least one of a preamble index included in the random access request or an ID of a user equipment included in the random access request, as an index of the first multiple access signature of the respective user equipment, and acquiring the first multiple access signature of the respective user equipment according to the index of the first multiple access signature of the respective user equipment.

10. The method of claim 8, wherein the step A comprises:
acquiring, for a respective user equipment, a first multiple access signature of the respective user equipment according to an index of the first multiple access signature of the respective user equipment included in a random access request sent by the respective user equipment.

11. The method of claim 8, wherein the step A comprises:
for a respective user equipment, determining, according to predefined correspondence between first parts of indexes of multiple access signatures and combinations of physical resources used by random access requests, and at least one of preamble indexes or IDs of user equipments, a first part of an index of a multiple access signature corresponding to a combination of a physical resource used by a random access request sent by the respective user equipment, and at least one of a preamble index included in the random access request or an ID of a user equipment included in the random access request, as a first part of an index of the first multiple access signature of the respective user equipment;
combining the first part of the index of the first multiple access signature with a second part of the index of the first multiple access signature included in the random access request sent by the respective user equipment to obtain the index of the first multiple access signature of the respective user equipment; and
acquiring the first multiple access signature of the respective user equipment according to the index of the first multiple access signature of the respective user equipment.

12. The method of claim 7, wherein the step D comprises:
sending the intervention results for the respective user equipments through random access responses.

13. The method of claim 12, wherein the step D comprises:
for the respective user equipment of which the intervention result is to adopt the second multiple access signature, sending, according to predefined correspondence between indexes of multiple access signatures and physical resources used by random access responses, a random access response to the user equipment of which the intervention result is to adopt the second multiple access signature using a physical resource corresponding to an index of the second multiple access signature.

14. The method of claim 12, wherein the step D comprises:
for the respective user equipment of which the intervention result is to adopt the second multiple access signature, calculating an offset between an index of the second multiple access signature and an index of the first multiple access signature, and including the offset in a random access response of the respective user equipment of which the intervention result is to adopt the second multiple access signature.

15. The method of claim 12, wherein the step D comprises:
for the respective user equipment of which the intervention result is to adopt the second multiple access signature, including an index of the second multiple access signature in a random access response of the respective user equipment of which the intervention result is to adopt the second multiple access signature.

16. The method of claim 12, wherein the step D comprises:
for the respective user equipment of which the intervention result is to adopt the second multiple access signature, calculating an offset between a second part of an index of the second multiple access signature and a second part of an index of the first multiple access signature;
including the offset in the random access response; and
sending, according to predefined correspondence between first parts of indexes of multiple access signatures and physical resources used by random access responses, a random access response to the respective user equipment of which the intervention result is to adopt the second multiple access signature using a physical resource corresponding to a first part of the index of the second multiple access signature.

17. The method of claim 12, wherein the step D comprises:
for the respective user equipment of which the intervention result is to adopt the second multiple access signature, including a second part of an index of the second multiple access signature in the random access response; and
sending, according to predefined correspondence between first parts of indexes of multiple access signatures and physical resources used by random access responses, a random access response to the respective user equipment of which the intervention result is to adopt the second multiple access signature using a physical resource corresponding to a first part of the index of the second multiple access signature.

18. A base station, comprising:
a processor;
a non-transitory machine-readable storage medium; and
a program module stored in the non-transitory machine-readable storage medium and executed by the processor;
wherein the program module is to:
step A, receive, from respective user equipments, first multiple access signatures selected by the respective user equipments;
step B, predict mutual interference caused by data transmission performed simultaneously by the respective user equipments using the first multiple access signatures of the respective user equipments, determine a respective user equipment of which mutual interference is predicted to be higher than a predetermined level as a user equipment to be intervened, and determine, for a respective user equipment of which mutual interference is predicted to be not higher than the predetermined level, that to adopt a first multiple access signature of the respective user equipment of which the mutual interference is predicted to be not higher than the predetermined level is an intervention result for the respective user equipment of which the mutual interference is predicted to be not higher than the predetermined level;
step C, for a respective user equipment to be intervened, select a multiple access signature capable of making the mutual interference not higher than the predetermined level as a second multiple access signature, and determine that to adopt the second multiple access signature is an intervention result for the respective user equipment to be intervened; and
step D, send intervention results for the respective user equipments.

* * * * *